United States Patent
Kobayashi

(10) Patent No.: US 7,200,116 B2
(45) Date of Patent: Apr. 3, 2007

(54) COMMUNICATION DEVICE AND METHOD, AND SYSTEM

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 09/918,281

(22) Filed: Jul. 30, 2001

(65) Prior Publication Data

US 2002/0118641 A1  Aug. 29, 2002

(30) Foreign Application Priority Data

Feb. 23, 2001  (JP) ............................ 2001-048801

(51) Int. Cl.
*H04L 12/26* (2006.01)

(52) U.S. Cl. ...................... 370/237; 370/236

(58) Field of Classification Search ........ 370/235–237, 370/254, 392, 395.31, 400, 401; 709/224; 714/1–4
See application file for complete search history.

(56) References Cited

U.S. PATENT DOCUMENTS

| | | | |
|---|---|---|---|
| 6,201,810 B1 * | 3/2001 | Masuda et al. ........ | 370/395.32 |
| 6,259,696 B1 * | 7/2001 | Yazaki et al. .......... | 370/395.21 |
| 6,581,166 B1 * | 6/2003 | Hirst et al. ............... | 714/4 |
| 6,681,232 B1 * | 1/2004 | Sistanizadeh et al. .... | 707/104.1 |
| 6,687,230 B1 * | 2/2004 | Furutono et al. ........... | 370/238 |
| 6,721,273 B1 * | 4/2004 | Lyon .......................... | 370/235 |
| 6,741,572 B1 * | 5/2004 | Graves et al. .............. | 370/254 |
| 2001/0007560 A1 * | 7/2001 | Masuda et al. ............. | 370/401 |
| 2002/0133584 A1 * | 9/2002 | Greuel et al. ............... | 709/224 |
| 2004/0085962 A1 * | 5/2004 | Sugai et al. ................ | 370/392 |

FOREIGN PATENT DOCUMENTS

| | | |
|---|---|---|
| JP | 07-240787 | 9/1995 |
| JP | 07-250078 | 9/1995 |
| JP | 9-270801 | 10/1997 |
| JP | 2000174755 A * | 6/2000 |
| JP | 2001-016262 | 1/2001 |

OTHER PUBLICATIONS

Computer translation of the above Japanese Patent (JP 2000174755 A).*
Japanese Office Action dated Jan. 31, 2006.

* cited by examiner

Primary Examiner—Huy D. Vu
Assistant Examiner—Clemence Han
(74) Attorney, Agent, or Firm—Katten Muchin Rosenman LLP

(57) ABSTRACT

A communication device connectable to an IP network includes a congestion monitor unit monitoring whether the communication device is congested, and a congestion information creating unit creating congestion information concerning a congested state of the communication device when the congestion monitor unit detects the congested state thereof, the congestion information being sent to other devices connected to the IP network.

16 Claims, 22 Drawing Sheets

FIG.4
| DATA DESTINATION | ROUTER OF NEXT STAGE | NUMBER OF ROUTERS |
|---|---|---|
| NETWORK C | 101 | 3 |
| NETWORK D | 101 | 3 |
| : | | : |
| : | | : |
 ← 301
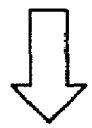 UPDATE BASED ON RECEIVED CONGESTION INFORMATION
| DATA DESTINATION | ROUTER OF NEXT STAGE | NUMBER OF ROUTERS |
|---|---|---|
| NETWORK C | 110 | 4 |
| NETWORK D | 110 | 4 |
| : | | : |
| : | | : |
 ← 302

FIG. 10

| TOPOLOGY DATABASE | NETWORK | | | | | | | | | | | |
|---|---|---|---|---|---|---|---|---|---|---|---|---|
| ROUTER | 1 | 2 | 3 | 4 | 5 | 6 | 7 | 8 | 9 | 10 | 11 | 12 |
| 1 | 0 | 0 | 0 | | | | | | | | | |
| 2 | | 0 | 0 | 0 | | | | | 0 | | | |
| 3 | | | | 0 | 0 | | | | | 0 | | |
| 4 | | | | | 0 | 0 | | | | | | |
| 5 | | | | | | 0 | 0 | | | | | |
| 6 | | | | | | | 0 | 0 | | | 0 | 0 |
| 7 | | | | | | | | | 0 | 0 | 0 | 0 |

FIG.11

| ROUTE NUMBER | ROUTE FROM NETWORK 1 TO NETWORK 7 | NUMBER OF ROUTER STAGES | VALID |
|---|---|---|---|
| 1 | ROUTER 1 – ROUTER 3 – ROUTER 5 | 3 | ○ |
| 2 | ROUTER 1 – ROUTER 2 – ROUTER 7 – ROUTER 5 | 4 | ○ |
| 3 | ROUTER 1 – ROUTER 2 – ROUTER 4 – ROUTER 6 | 4 | ○ |
| 4 | ROUTER 1 – ROUTER 2 – ROUTER 7 – ROUTER 4 – ROUTER 6 | 5 | ○ |
| 5 | ROUTER 1 – ROUTER 3 – ROUTER 7 – ROUTER 4 – ROUTER 6 | 5 | ○ |
| 6 | ROUTER 1 – ROUTER 2 – ROUTER 4 – ROUTER 7 – ROUTER 5 | 5 | ○ |
| 7 | ROUTER 1 – ROUTER 2 – ROUTER 7 – ROUTER 3 – ROUTER 5 | 5 | ○ |
| 8 | ROUTER 1 – ROUTER 3 – ROUTER 5 – ROUTER 7 – ROUTER 4 – ROUTER 6 | 6 | ○ |
| 9 | ROUTER 1 – ROUTER 3 – ROUTER 7 – ROUTER 2 – ROUTER 4 – ROUTER 6 | 6 | ○ |

FIG. 12

| TOPOLOGY DATABASE | NETWORK | | | | | | | | | | | |
|---|---|---|---|---|---|---|---|---|---|---|---|---|
| ROUTER | 1 | 2 | 3 | 4 | 5 | 6 | 7 | 8 | 9 | 10 | 11 | 12 |
| 1 | 0 | 0 | 0 | | | | | | | | | |
| 2 | | 0 | | 0 | | | | | 0 | | | |
| 3 | | | 0 | | × | | | | | 0 | | |
| 4 | | | | 0 | × | 0 | | | | | | |
| 5 | | | | | | | 0 | | | | | |
| 6 | | | | | | 0 | 0 | 0 | | | | |
| 7 | | | | | | | | | 0 | 0 | 0 | 0 |

FIG.13

| ROUTE NUMBER | ROUTE FROM NETWORK 1 TO NETWORK 7 | NUMBER OF ROUTER STAGES | VALID | EXCEPTIONAL CONDITION |
|---|---|---|---|---|
| 1 | ROUTER 1 – ROUTER 3 – ROUTER 5 | 3 | × | • TRANSMISSION SOURCE IP ADDRESS: xxx.xx.xxx.xxx<br>• INTERFACE: #y<br>• PROTOCOL ID: z |
| 2 | ROUTER 1 – ROUTER 2 – ROUTER 4 – ROUTER 6 | 4 | ○ | |
| 3 | ROUTER 1 – ROUTER 2 – ROUTER 7 – ROUTER 5 | 4 | ○ | |
| 4 | ROUTER 1 – ROUTER 2 – ROUTER 7 – ROUTER 4 – ROUTER 6 | 5 | ○ | |
| 5 | ROUTER 1 – ROUTER 3 – ROUTER 7 – ROUTER 4 – ROUTER 6 | 5 | ○ | |
| 6 | ROUTER 1 – ROUTER 2 – ROUTER 4 – ROUTER 7 – ROUTER 5 | 5 | ○ | |
| 7 | ROUTER 1 – ROUTER 2 – ROUTER 7 – ROUTER 3 – ROUTER 5 | 5 | ○ | |
| 8 | ROUTER 1 – ROUTER 3 – ROUTER 5 – ROUTER 7 – ROUTER 4 – ROUTER 6 | 6 | ○ | |
| 9 | ROUTER 1 – ROUTER 3 – ROUTER 7 – ROUTER 2 – ROUTER 4 – ROUTER 6 | 6 | ○ | |

FIG.15

| DATA DESTINATION | ROUTER OF NEXT STAGE | NUMBER OF ROUTERS |
|---|---|---|
| NETWORK 7 | ROUTER 3 | 3 |
| : | : | : |
| | | : |
| : | | : |

← 1401

⇩ UPDATE BASED ON RECEIVED CONGESTION INFORMATION

| DATA DESTINATION | ROUTER OF NEXT STAGE | NUMBER OF ROUTERS | EXCEPTIONAL CONDITION |
|---|---|---|---|
| NETWORK 7 | ROUTER 2 | 4 | [ルータ3へ転送]<br>・TRANSMISSION SOURCE IP ADDRESS: xxx.xx.xxx.xxx<br>・INTERFACE:#y<br>・PROTOCOL ID:z |
| : | : | : | |
| | | : | |
| : | | : | |

← 1402

COMMUNICATION DEVICE AND METHOD, AND SYSTEM

DESCRIPTION OF CROSS-REFERENCE TO OTHER APPLICATIONS

The present application is based on Japanese Priority Patent Application No. 2000-048801 filed on Feb. 23, 2000, the entire contents of which are hereby incorporated by reference.

BACKGROUND OF THE INVENTION

1. Field of the Invention

The present invention generally relates to networks using the IP (Internet Protocol), and more particularly, to a control executed when a congestion occurs in the network.

2. Description of the Related Art

Recently, the importance of IP data communications has been increased because of rapid popularization of personal computers, the Internet, active installation of intra-networks, and integration of voice and data on the IP (VoIP). Further, the networks themselves have had advanced functions and performance, and various applications have come into wide use. Examples of applications are electronic mail, WWW and reproduction of moving images and audio sound.

The arrangement of the network infrastructure actually makes it possible to increasingly transfer a variety of data on the IP. It is now expected that data communications (IP communications) will continuously come into wider use. On the other hand, there is a serious problem to be solved in the entire data communications. Such a problem relates to congestion control.

The congestion control function depends on a slow start algorithm of TCP/IP (Transmission Control Protocol/Internet Protocol) installed at each end system in IP communications. That is, the congestion control or congestion avoidance control has not been established in network sections of the infrastructure. Therefore, routing control directed to avoiding a congested route is not performed in the network at all.

The congestion control function performed at the end system is illustrated in FIG. 1. Referring to this figure, the TCP/IP recognizes that a related network may be too slow and starts operating. At the commencement of the congestion control, the transmitter sends a minimum packet, namely, a single packet. Then, the transmitter gradually increases the number of packets to be sent. If a packet is discarded due to a congestion in the network, and therefore an acknowledgement (ACK) has not been sent back, the transmitter drastically reduces the number of packets to be sent, and gradually increases the number of packets again. In the worst case in the above control, the TCP module of the end system sets the number of packets to zero and then increases the number of packets gradually in order to dissolve the congestion in the network. Therefore, the number of packets may be reduced on the sender side even if the network is not congested or another normal route is available at the time of reducing the amount of transmission. In addition, no algorithm of dynamically sending data over another route is neither available in the TCP nor the network. Thus, communications do not take place efficiently.

Recently, IP data has been used for multimedia streaming of moving pictures and voice. Video data and voice data have a relatively large amount of data and are continuously sent for a long time. This may congest the route over a long period and may affect other data communications. Also, UDP (User Datagram Protocol) is used for multimedia data. The UDP does not have the function of retransmission and slow start. Therefore, there is a possibility that a large amount of data may be discarded when data passes through the congested network.

In order to solve the above problems, it is necessary to transfer data packets over a route that is not busy or congested. However, a technique of the above routing has not yet been established.

Further, the prior art does not provide any congestion avoiding technique in the network section. Thus, data may be routed via the shortest path even when data can be routed to another path which is not in the congested state. Thus, the entire network cannot be utilized efficiently.

As described above, the congestion control cannot be sufficiently achieved totally by only the TCP/IP based congestion control. In addition, data cannot be routed to an idle path, which prevents data communications from taking place efficiently and the entire network from being utilized efficiently.

SUMMARY OF THE INVENTION

It is a general object of the present invention to overcome the above-mentioned problems.

A more specific object of the present invention is to achieve efficient usage of network and communications by using a network relay device such as a router capable of handling congestion control.

The above objects of the present invention are achieved by a communication device connectable to an IP network, comprising: a congestion monitor unit monitoring whether the communication device is congested; and a congestion information creating unit creating congestion information concerning a congested state of the communication device when the congestion monitor unit detects the congested state thereof, the congestion information being sent to other devices connected to the IP network.

The above objects of the present invention are also achieved by a communication control method comprising the steps of: monitoring whether the communication device is congested; creating congestion information concerning a congested state of the communication device when the congested state thereof is detected, the congestion information being sent to other devices connected to the IP network; and defining an accounting system based on a packet discard ratio determined based on a congestion avoiding control.

The above objects of the present invention are also achieved by a communication control method comprising the steps of: monitoring whether the communication device is congested; and creating congestion information concerning a congested state of the communication device when the congested state thereof is detected, the congestion information being sent to other devices connected to the IP network.

The above objects of the present invention are also achieved by a system comprising: a plurality of communication devices, each of the plurality of communication devices comprising: a congestion monitor unit monitoring whether the communication device is congested; and a congestion information creating unit creating congestion information concerning a congested state of the communication device when the congestion monitor unit detects the congested state thereof, the congestion information being sent to other devices connected to the IP network.

BRIEF DESCRIPTION OF THE DRAWINGS

Other objects, features and advantages of the present invention will become more apparent from the following detailed description when read in conjunction with the accompanying drawings, in which:

FIG. 4 is a diagram of an example of routing executed by the router;

FIG. 10 is a diagram of a network topology database;

FIG. 11 is a list of routes from network 1 to network 7 shown in FIG. 9;

FIG. 12 is a diagram of a topology database when network 5 shown in FIG. 9 is congested;

FIG. 13 is a diagram of a list of routes from network 1 to network 7 available when network 5 shown in FIG. 9 is congested;

FIG. 15 is a diagram of a routing table provided in router 1 when network 5 shown in FIG. 9 is congested;

DESCRIPTION OF THE PREFERRED EMBODIMENTS

Figure 1:
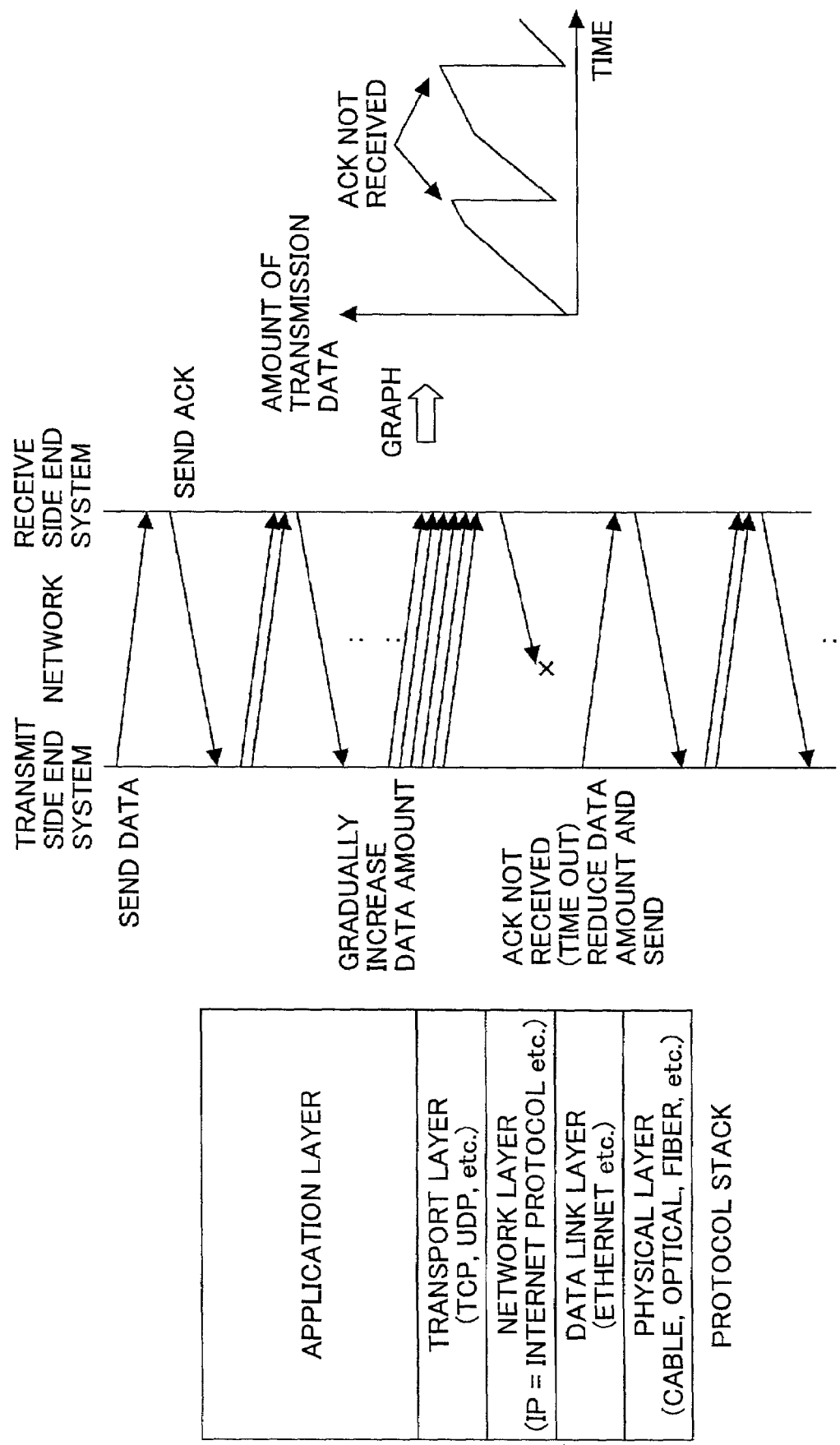
FIG. 1 is a diagram of illustrating TCP and a slow start algorithm.
Figure 2:
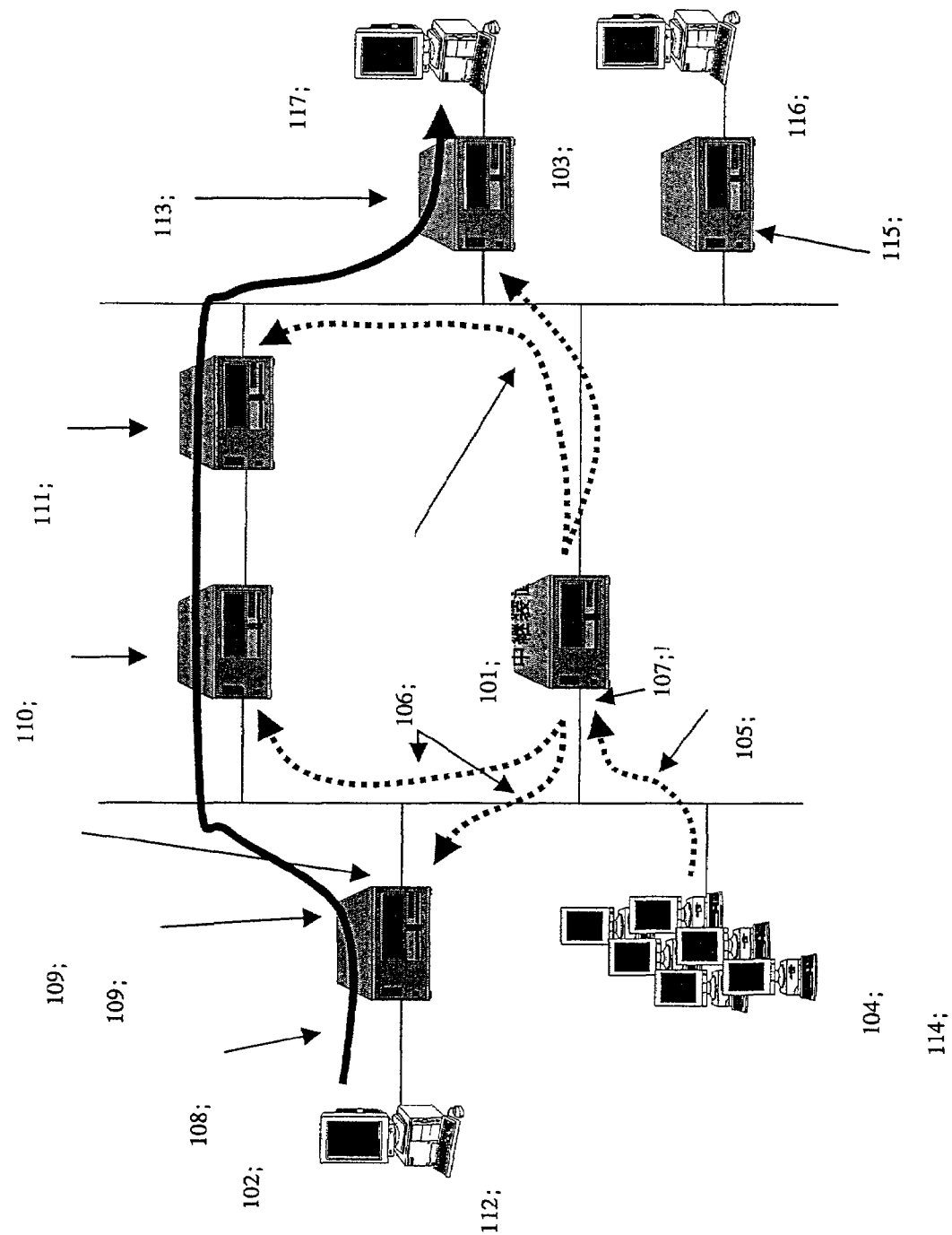
FIG. 2 is a diagram of the principles of the present invention.

FIG. 2 is a diagram for explaining the principles of the present invention.

FIG. 2 illustrates a system configured as follows. A network (A) 112, a network (B) 114, a network (C) 117 and a network (D) 116 are connected via communication devices such as network relay apparatuses (routers) 101, 109, 110, 111, 113 and 115, as shown in FIG. 2. Each of the networks are IP networks.

It is assumed that an interface unit 107 of the router 101 is congested due to data 105 sent by a group 104 of clients connected to the network 114. In this case, the router 101 sends congestion information 106 to the other routers in order to notify the other routers that the router 101 is in the congested state. By way of example, it is considered that a computer connected to the network 112 serves as a data sending host 102 and attempts to send data to a computer (data receiving host) 103 connected to the network 117. The normal sequence selects a route having the smallest number of routers over which data is transferred. Thus, normally, the router 109 to which the data sending host 102 is connected selects a route including the router 101.

However, the router 109 has been notified that the interface 107 of the router 101 is in the congested state. Therefore, the router 109 selects a route 108 that is not the shortest path but is normal. The router 101 routes transmission data to the router 110. It is therefore possible to transfer data efficiently and thus utilize the network efficiently.

If another path that is the shortest is available, it will be selected. When a route that is not the shortest path is selected, a route that is the second shorted path is selected. The system configuration shown in FIG. 2 is exemplarily illustrated, and the present invention includes all IP networks. Examples of the IP networks are intranets, Internet, ISP (Internet Service Provider) networks. The interface 107 that is in the congested state may be an input interface of the router 101 or an output interface thereof. Also, the interface 107 may be an intermediate portion between the input interface and the output interface. The networks other than the router 101 or some networks may perform the same congestion control as that of the router 101. The routers may be incorporated into the communication devices connected to the networks or may be a stand-alone router.

Figure 3A:
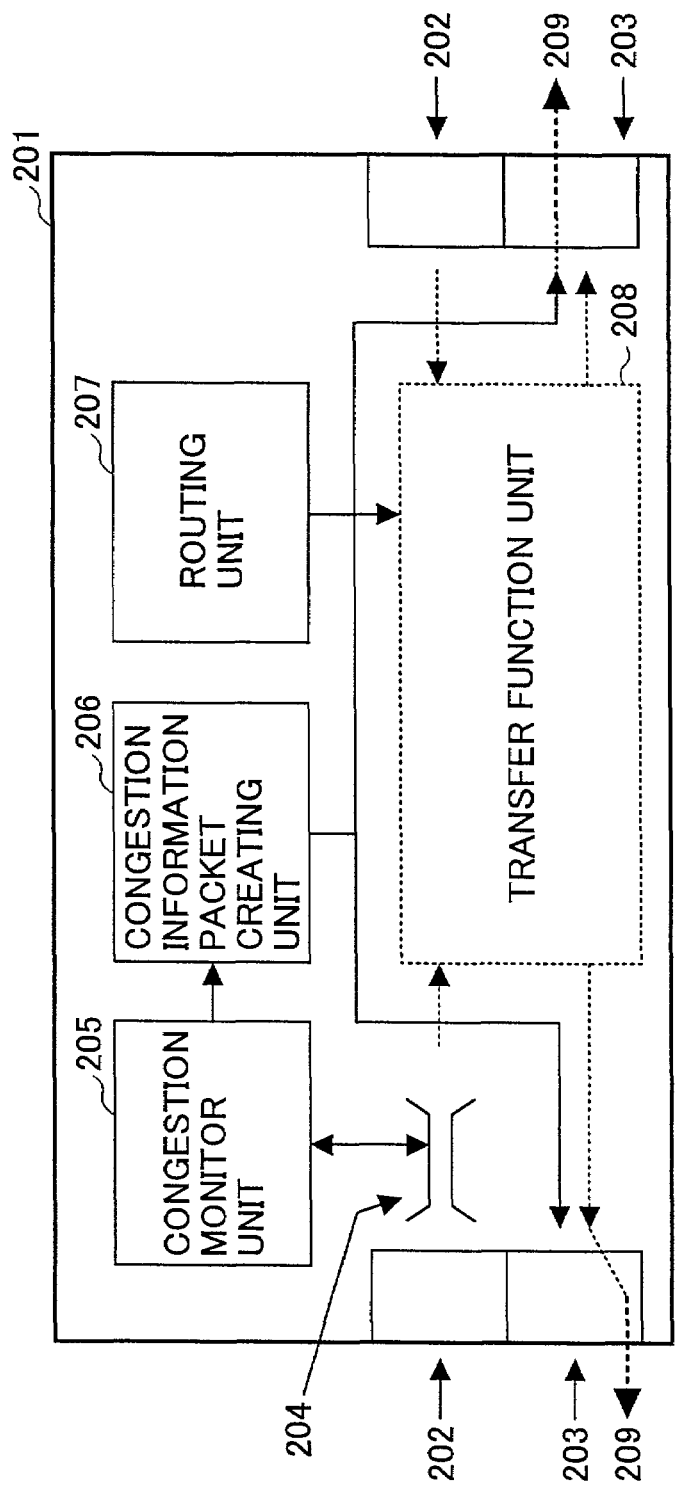
FIG. 3 is a block diagram of a router (network relay device) configured according to an aspect of the present invention.
Figure 3B:
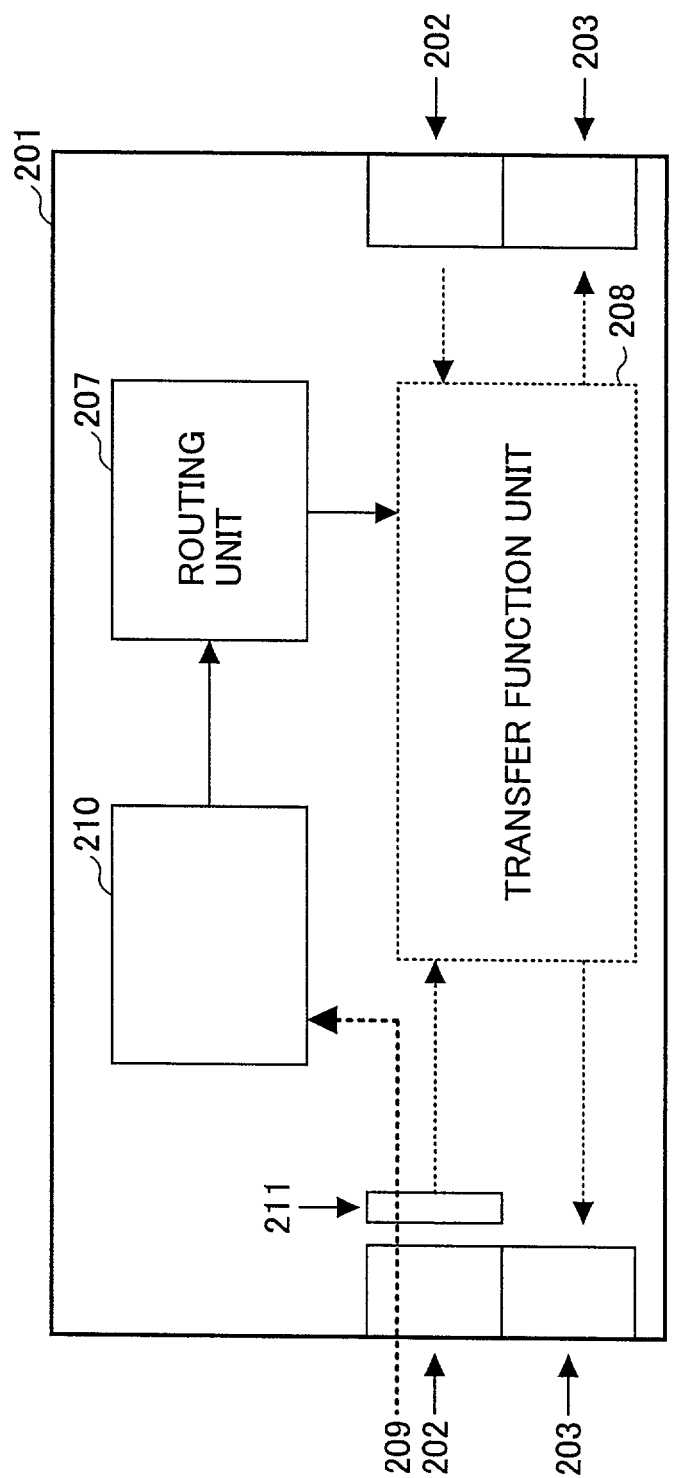

FIGS. 3A and 3B are block diagrams of each router shown in FIG. 2, and schematically illustrate structural elements related to the congestion control. For the convenience' sake, a reference number 201 is used to identify each router shown in FIG. 2.

Figure 5:
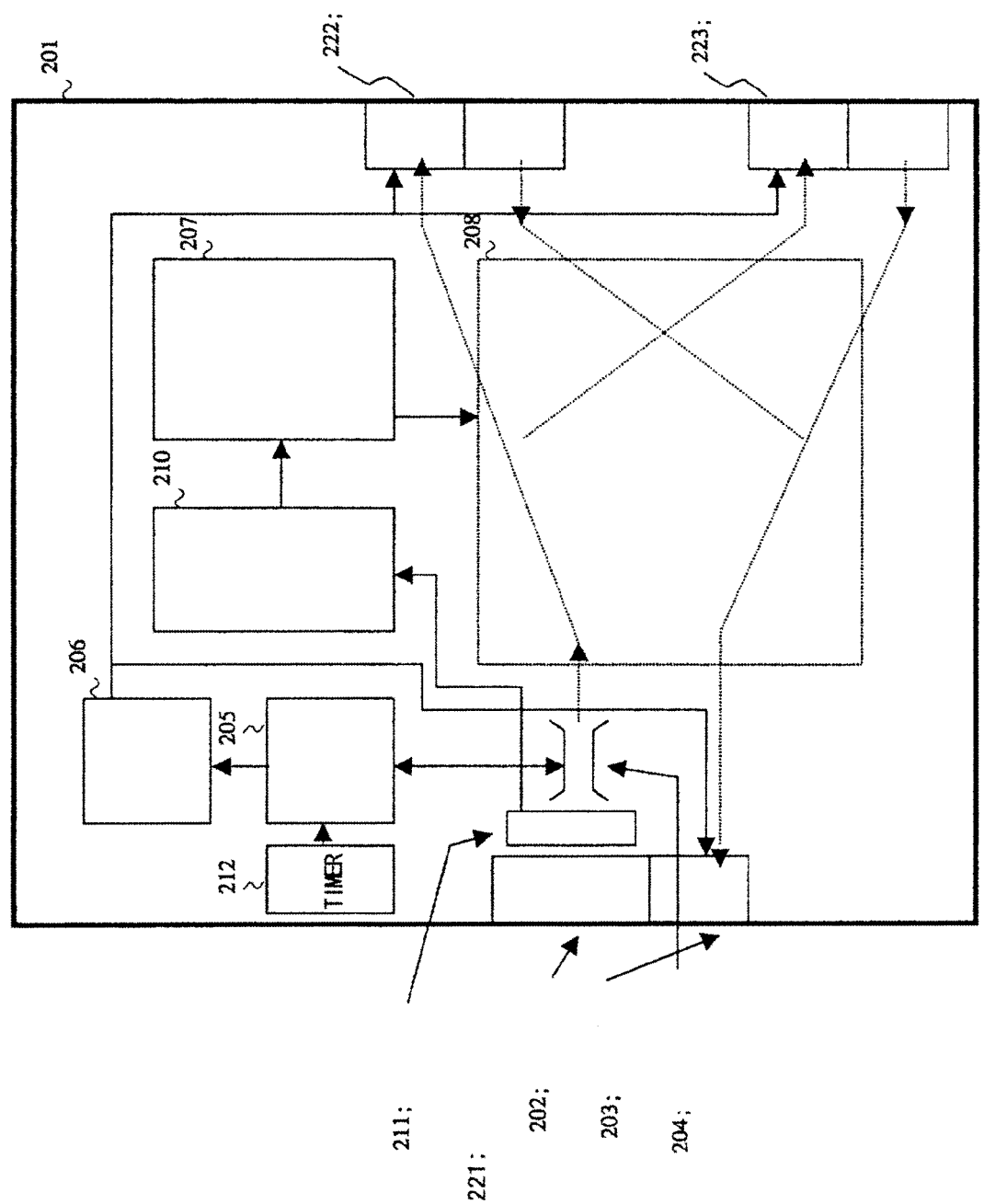
FIG. 5 is a block diagram of a router according to a first embodiment of the present invention.

More specifically, FIG. 3A is a block diagram of realizing the function of detecting congestion and notifying other routers of occurrence of congestion. FIG. 3B is a block diagram of receiving information about congestion from another router and processing the received congestion information. In order to facilitate better understanding the configuration of the router 201, an identical part is illustrated as if the configurations shown in FIGS. 3A and 3B have separate parts. When the configurations shown in FIGS. 3A and 3B are integrated, a resultant configuration is illustrated in FIG. 5, which will be described later.

The router 201 includes a receive port 202, a transmit port 203, input queue (buffer) 204, a congestion monitor 205, a congestion information packet creating unit 206, a routing table 207, a transfer function unit 208, a congested state database 210, and a packet decision unit 211. The receive port 202, the transmit port 203, the routing table 207 and the transfer function unit 208 are illustrated in both the figures.

The input queue 204 includes a buffer, which holds received packets until these packets are sent for the next process.

FIG. 4 shows a routing table provided in the router. A reference number 301 indicates a routing table in a normal state. A reference number 302 indicates a routing table in the router related to a case where a route in the network (in a router in the network) is congested. The contents of the routing table 302 have been updated in response to congestion information.

A description will be given of a routing control directed to avoiding the congested point in the network shown in FIG. 2 and an operation of the router 201 shown in FIG. 3.

It is assumed that the interface 107 of the router 101 in the network shown in FIG. 2 is congested by data sent by the group 104 of clients. In other words, a route in which the router 101 exists is in the congested state.

At that time, the router 101 monitors the state of the input queue 204 in FIG. 3A and detects a situation in which the interface port (receive port) 202 is in the congested state. Then, the router 101 sends information about the congestion to the congestion packet information creating unit 206, which creates a packet used for transferring the congestion information to the other routers. This packet is a congestion information packet 209 including the congestion information, which is sent to the routers in the network via the transmit port of the router.

The packet decision unit 11 of each of the routers in the network determines whether the received packet relates is the congestion information. When the congestion information is received, the packet decision unit 211 registers it with the congested state database 210, and makes an instruction that updates the routing table 207. Thus, each router knows that the route including the router 101 is in the congested state, and updates the routing table from the table 301 to the table 302. The routing table 301 in the normal state shows that the router of the next stage is the router 101. On the other hand, the routing table 302 after the congestion information is received shows that the router 110 is designated as the router of the next stage. Thus, other communications, for example, data 108 sent by the data transmission host 102 do not use the route that is in the congested state and may cause packets to be discarded or delayed. That is, the data 108 sent by the host 102 is switched to a normal route including the routers 110 and 111 rather than the congested route though the contested route is the shorted route. It is therefore possible to prevent packets from being discarded or delayed.

A description will be given of embodiments of the present invention, which employ an OSPF (Open Shortest Path First) algorithm, which is used, as a routing protocol for networks, in a comparatively large network such as an ISP (Internet Service Provider) and causes each router to know the topology of the whole network. Of course, the present invention can be applied to systems that employ other routing protocols such as an RIP (Routing Information Protocol).

FIG. 5 is a block diagram of a configuration of the router 201 according to a first embodiment of the present invention. In FIG. 5, parts that are the same as those shown in the previously described figures are given the same reference numerals. A timer 212, which is not illustrated in FIG. 2, is connected to the congestion monitor unit 205. The router 201 includes three interfaces 221, 222 and 223. The interface 221 includes a receive port 202 and a transmit port 203. Similarly, each of the interfaces 222 and 223 has a receive port and a transmit port.

The router 201 shown in FIG. 5 monitors the input queue at the interface. An input queue 204 is connected to the interface 221, and the congestion monitor unit 205 monitors the state of the input queue 204. Although not illustrated, each of the interfaces 222 and 223 is equipped with the input queue, the congestion monitor unit 205, the congestion information packet creating unit 206 and the timer 212.

The congestion monitor unit 205 of the router 201 monitors the state of the input queue 204 at the interface 221. If the congestion monitor unit 205 detects the congested state of the input queue 204, the unit 205 sends an instruction to the congestion information packet creating unit 206. Upon receiving the instruction, the congestion information packet creating unit 206 creates a congestion information packet used to notify the network address of the congested interface 221 of the other routers. The congestion information packet is then sent via the ports of the interfaces 222 and 223.

Figure 6:
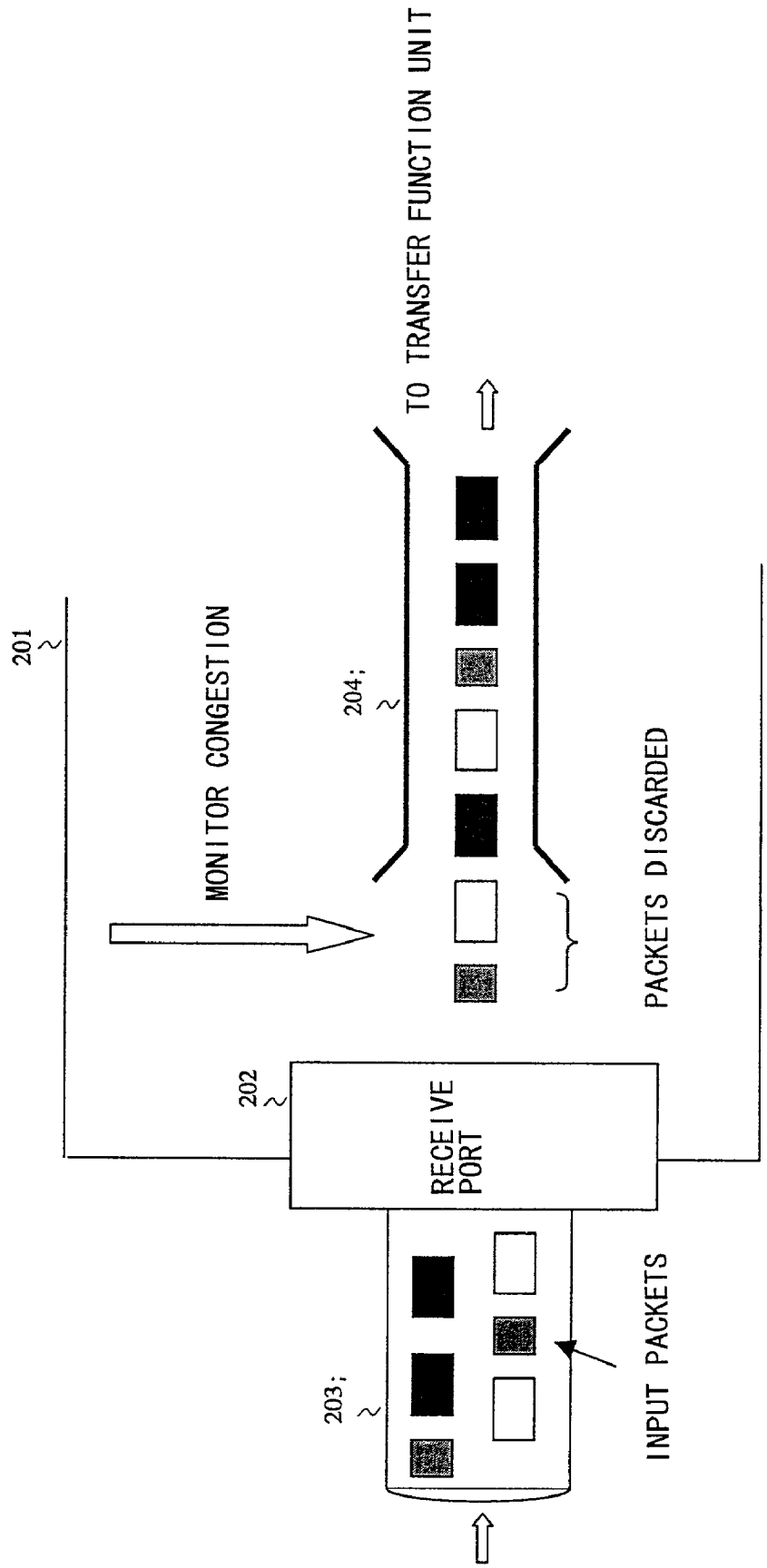
FIG. 6 is a diagram of a first method for monitoring an input queue.

There is a way, as the criterion for determining whether the interface is in the congested state, to acknowledge occurrence of congestion at the time when the input queue 204 overflows with input data and discarding of packets starts to take place. FIG. 6 shows the above way. The input packet transported over a transmission path 230 passes through the receive port 202 and is temporarily held in the input queue 204. The congestion monitor unit 205 monitors whether the input queue 204 starts to overflow with packets, causing packets to be discarded. If the packet discarding is detected, the congestion monitor unit 205 notifies the congestion information packet creating unit 206 of the occurrence of the congested state.

Figure 7:
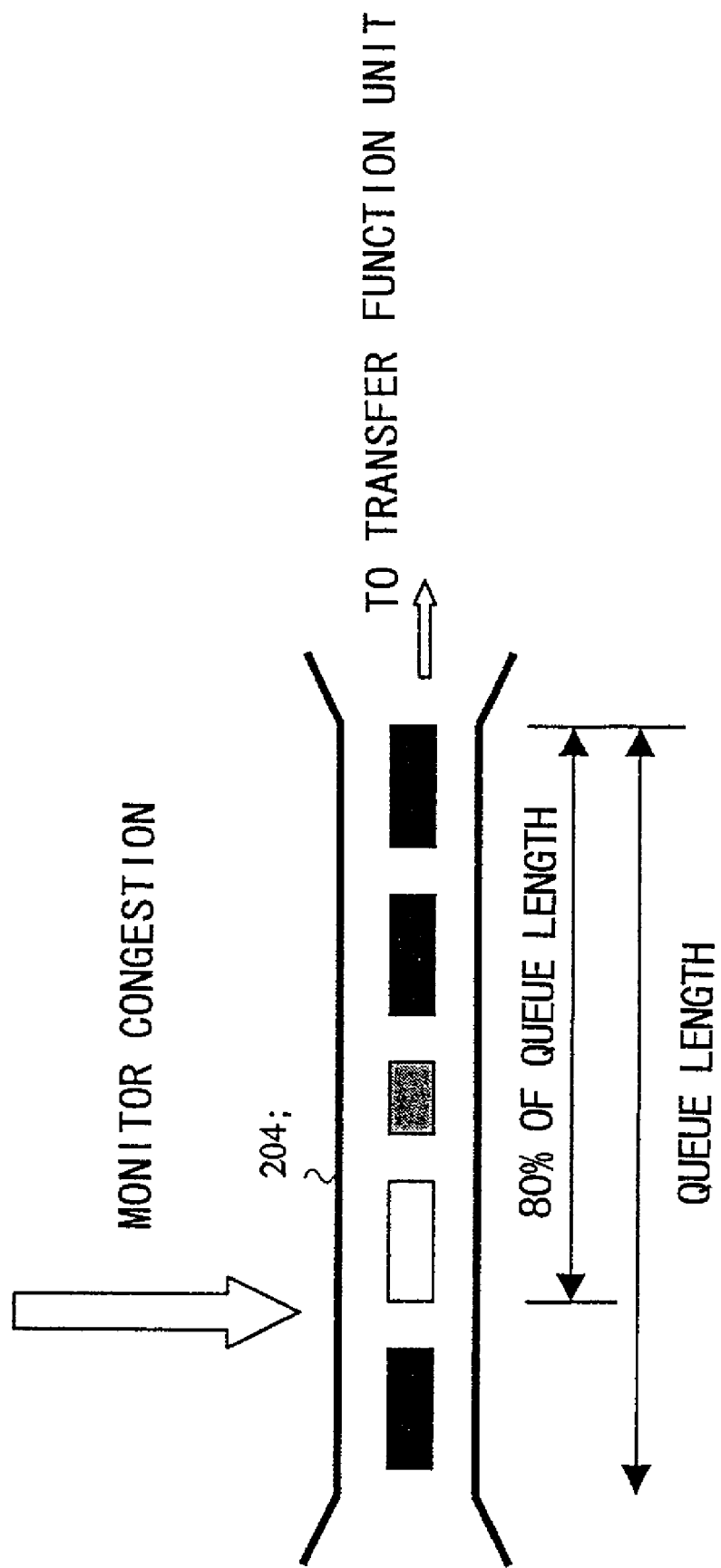
FIG. 7 is a diagram of a second method for monitoring the input queue.

Alternatively, as shown in FIG. 7 that shows a way different from that shown in FIG. 6, a threshold level that corresponds to 80% of the length of the input queue 204 is defined in the congestion monitor unit 205. If the amount of data held in the input queue 204 exceeds the threshold level, the congestion monitor unit 205 acknowledges the occurrence of congestion.

The way shown in FIG. 6 detects the state in which the input queue 204 is full of data. Thus, packets received after that are discarded. In this case, the resource of the router 201 (here the input queue 204) can be used 100%. On the other hand, the way shown in FIG. 7 acknowledges the input queue 204 to be congested when 80% of the input queue 204 is full of data. Thus, 20% of the input queue 204 may be not used. However, there is the advantage of making an early decision on congestion to reduce the possibility that other data traffic may be reduced.

When congestion at an input interface (the input interface 221 in the above example) is detected, the router 201 notifies of adjacent routers of the congestion information in a case where the target network is of a relatively small scale as shown in FIG. 2.

It is assumed again that the interface 107 of the router 101, namely, the route including the router 101 is congested due to data sent by the group 104 of clients. In this case, the router 101 sends the packet including the congestion information via the transmit port in order to notify the adjacent routers 109, 110, 113 and 115 of the occurrence of congestion.

Figure 8:
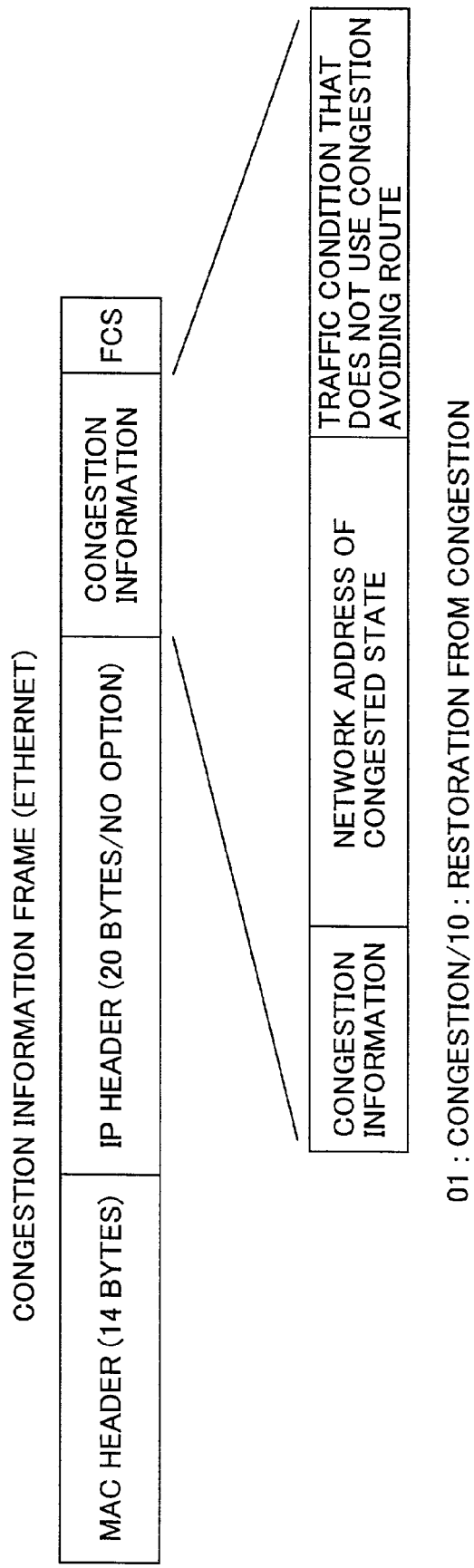
FIG. 8 is a diagram of a format of a congestion information packet.

FIG. 8 shows a format of the packet including the congestion information 106. The router 109 selects the shortest route by referring to the routing table 301 shown in FIG. 4 used in the normal situation. In contrast, when the router 109 receives the congestion information 106, it acknowledges the router 101 to be congested and selects the routing table 302 shown in FIG. 4. Thus, the received packets can be relayed with avoidance of the congested route.

The above routing may be preferably applied to a small-scale network in which two routes are provided between networks in order to ensure reliability of the network. In this case, one of the two routes is used for backup of the other route. In contrast, when both the routes are used to actually transport data, the network can be used efficiently. Data can be sent to the route having a comparatively small amount of traffic. This will reduce the possibility that packets may be discarded. The congestion information packet may be addressed to the routers directly adjacent to the questioned router by one of the following methods. A limited broadcasting method does not send data to the outside of the directly involved network. A multicasting method sends data having the IP header in which the TTL (Time to Live defined in the IP header) is set to "1". Each of the two methods is capable of simultaneously sending a single packet to a plurality of routers.

Figure 20:
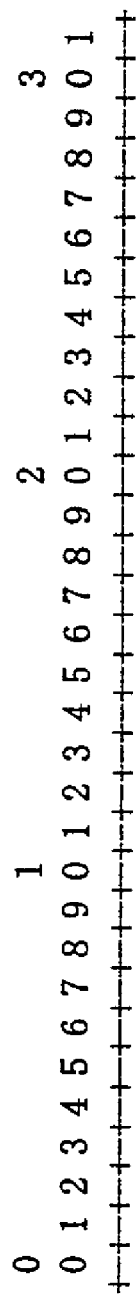
FIG. 20 is a diagram of an IPv4 header.
Figure 21:
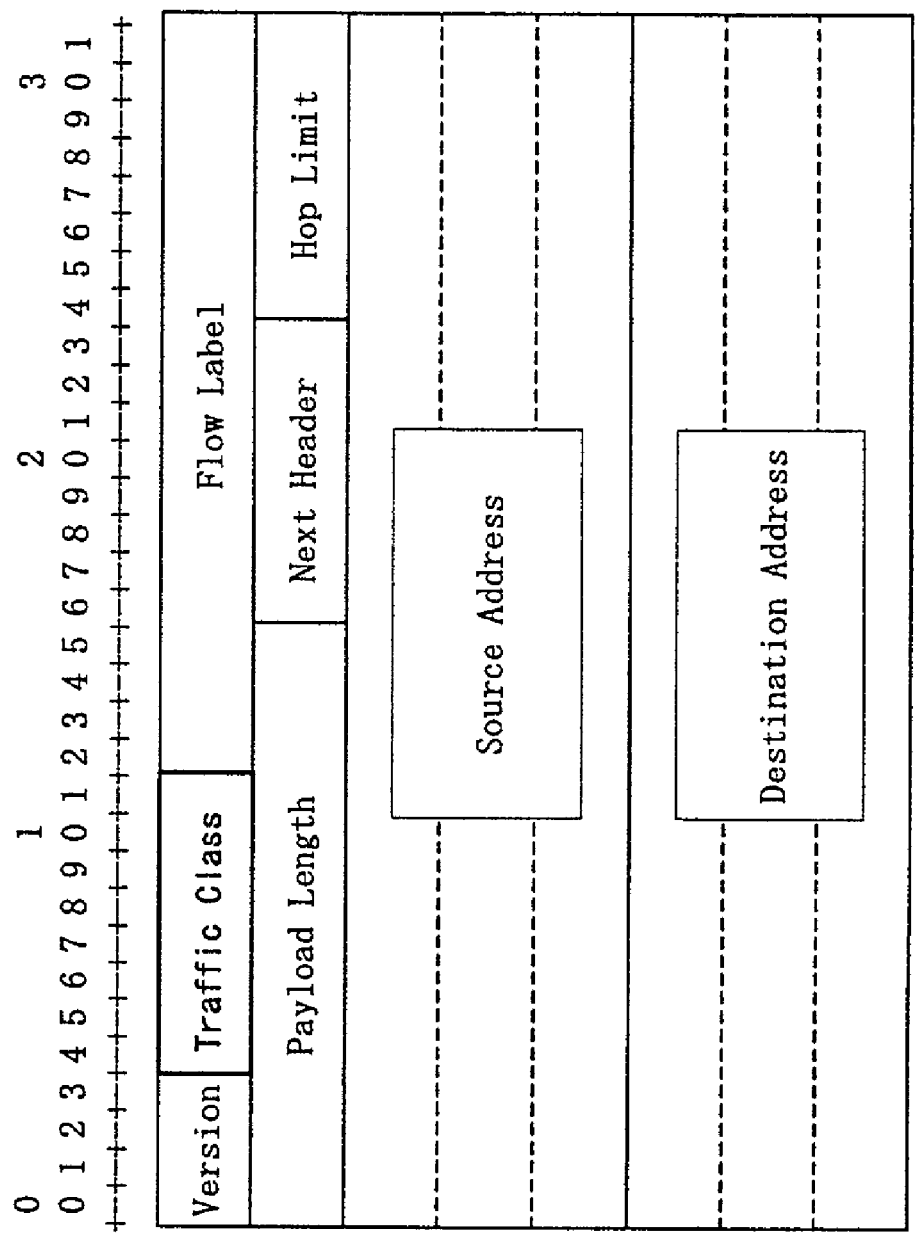
FIG. 21 is a diagram of an IPv6 header

In the format of the congestion information packet shown in FIG. 8, the first two bits of the congestion information provided in the IP header following the MAC header may be used to indicate occurrence of congestion (01) and restoration from congestion (10). The address of the network to which the target interface is connected is included in the packet. It is possible to discriminate the congestion information packet from other packets as follows. For example, the IPv4 header shown in FIG. 20 is allowed to use the last two bits of the type-of-service field. It is also possible to set a value other than the currently used value in the protocol field. The protocol field includes an ID number, which indicates what is the packet, in other words, what is carried by the packet. The ID number is "2" for ICMP (Internet Control Message Protocol) and "6" for TCP. These values are defined in #1700 of the RFC (Request For Comments) published by the IETF (Internet Engineering Task Force). The IPv6 header shown in FIG. 21 is allowed to use the last two bits of the traffic class field.

Figure 9:
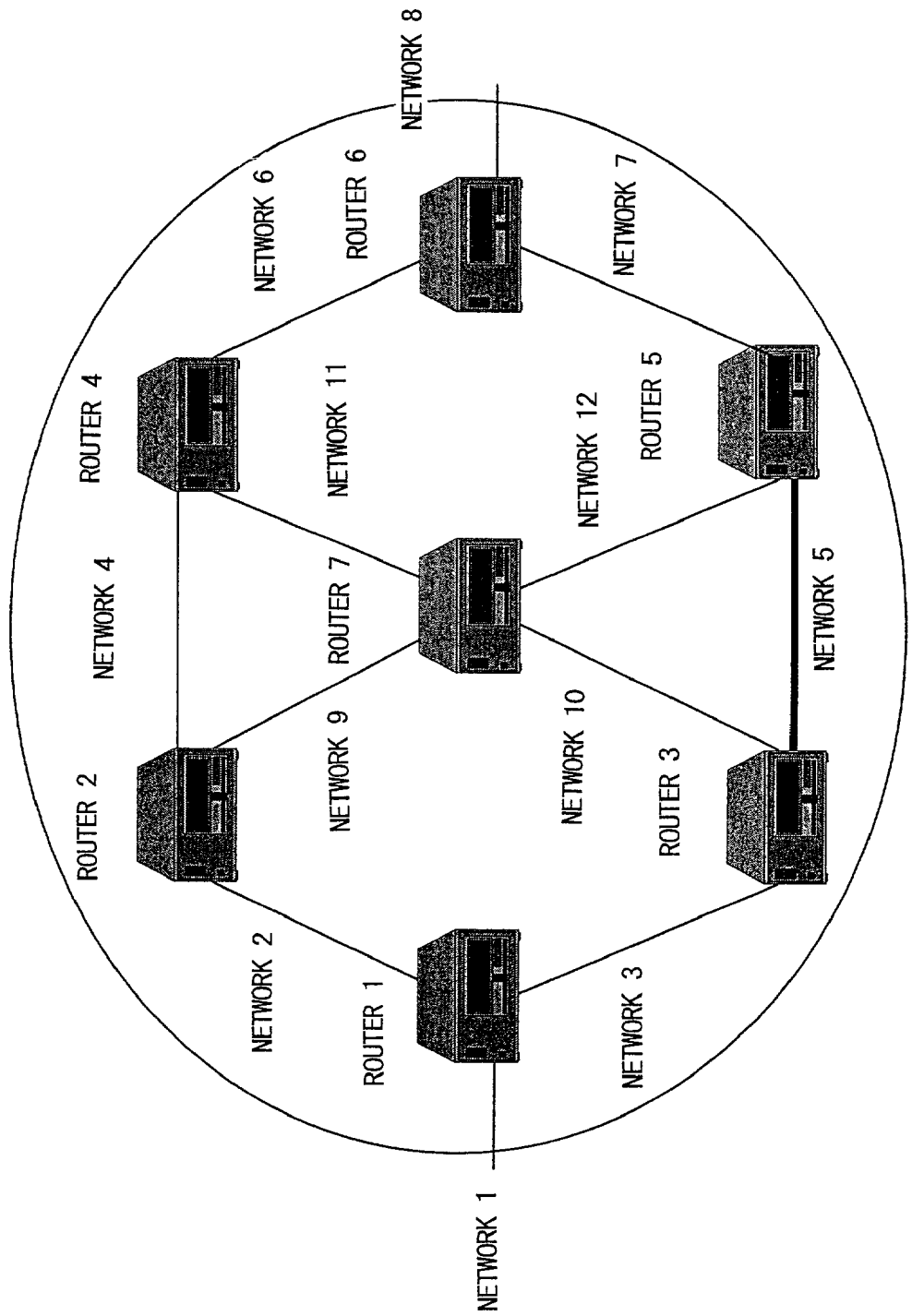
FIG. 9 is a diagram of a network to which the present invention is applied.

FIG. 9 shows a relatively large-scale network such as an intra IP network, an IP network to which Internet service providers are connected, or a network for providing IP service by a carrier. It is necessary to send the congestion information to the whole network of the large scale. This will be described below in detail.

Each of the routers in the large-scale network has the functions of monitoring and detecting congestion and creating the congestion information packet, as has been described previously. Differently from the previously-described router, each router in the large-scale network is required to deliver the congestion information packet to not only the adjacent routers but also all of the other routers included in the network. The congestion information packet created by a router may be sent to all of the other routers by a hop-by-hop method. More particularly, the router receives the congestion information packet via an input port, and sends it to other routers via all the output ports. If the same packet is received via another input port, the router does not send congestion information packet via the corresponding output port. In this manner, each router in the network is notified of the position in which the congestion has occurred.

In order to avoid a situation in which the congestion information packet is queued together with other packets and is discarded, the packet decision unit of each router determines whether the received packet is the congestion information packet. When the received packet is the congestion information packet, it is immediately sent to the congestion information database without being stored in the input queue.

Each of the routers in the network shown in FIG. 9 has a topology database shown in FIG. 10. The topology database shows which router is connected to which network. For example, each network is equipped with the topology database when a given routing protocol such as OSPF is used. The routing table is formed from the topology database.

The use of the topology database makes it possible to know all the routes from a network to another network, as shown in FIG. 11, which shows routes from the network 1 to the network 7 shown in FIG. 9.

Figure 14:
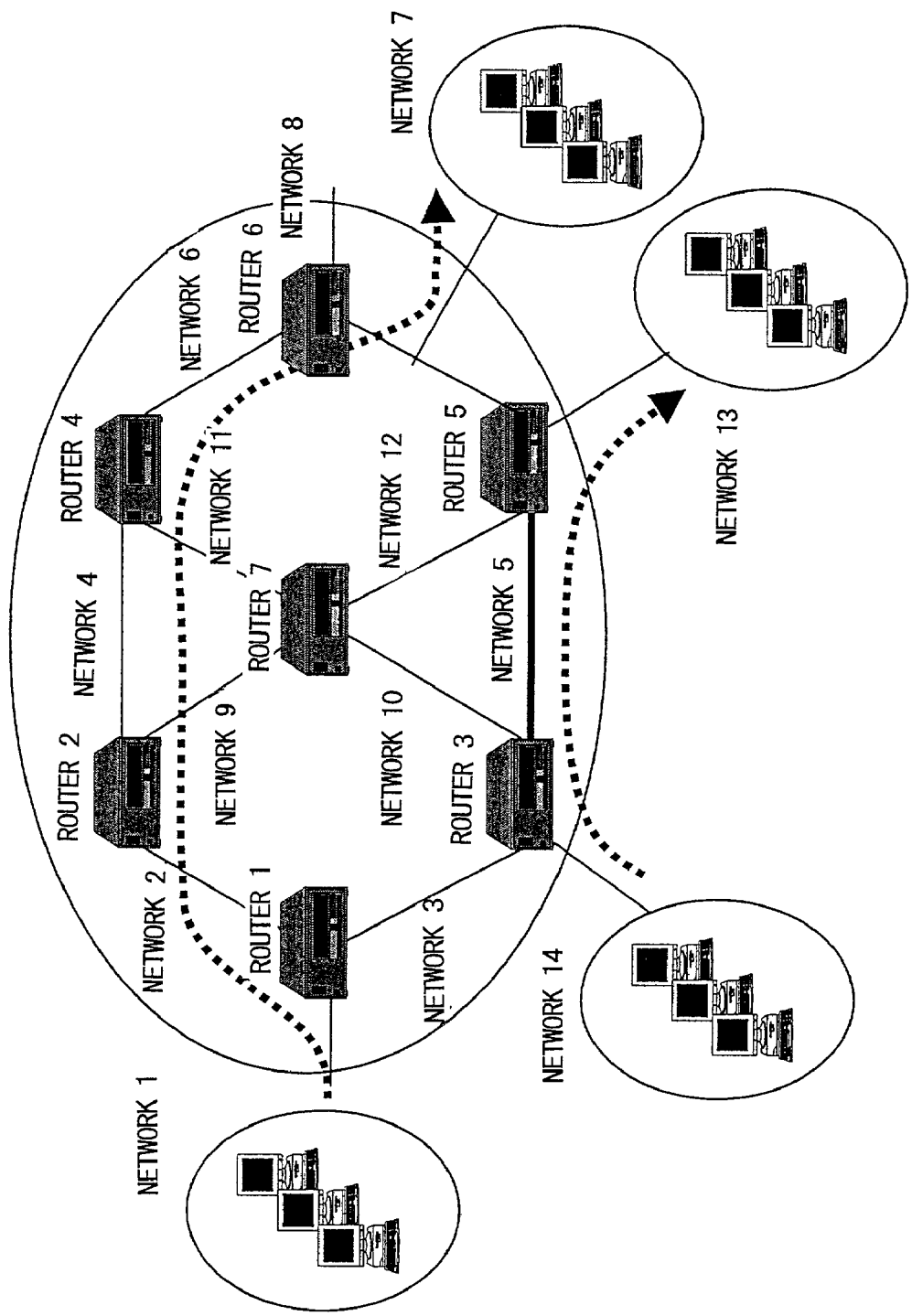
FIG. 14 is a diagram of a communication to which congestion avoiding route control of the present invention.

A congestion avoiding route control in the network shown in FIG. 9 will be described with reference to FIG. 14.

It is assumed that a large mount of data is transferred from a network 14 to a network 13, and a network 5 is in the congested state. Such a situation will occur when the network has a broad band whereas the networks 5 and 13 have narrow bands. Also, a similar situation will occur when data traffic passing through the network 5 from another network is high in addition to the traffic from the network 14.

The priority of selecting the route is uniformly defined in the whole network. For example, the priority is based on the number of routers involved. The smaller the number of routers, the higher the priority. Additional priority based on the router number may be used for the identical number of stages (the number of routers). The younger the router number, the higher the priority. If some networks which are not related to the route but is connected to the target router are in the congested state, it is expected that the router has a heavy load. In this case, the priorities of the routes to which the target router is related may be reduced. Of course, the route that passes through a network in the congested state is placed out of selection.

The topology database may be formed from the OSPF or may be provided exclusively for use in the congested state database 210. The list of routes shown in FIG. 11 may be provided exclusively for use in the congested state database or may be updated by updating the topology database upon receipt of the congestion information packet.

At that time, the congestion monitor 205 of the router 5 acknowledges the congested state of the input interface to which the network 5 is connected by the manner that has been described with reference to FIG. 6 or FIG. 7. The congestion information packet creating unit 206 creates the congestion information packet, which is sent via the output interfaces. The congestion information packet is serially transferred over the routers in the hop-by-hop method, so that each router is notified that the network 5 is in the congested state. Upon receiving the congestion information packet, each router updates the topology database as shown in FIG. 12, so that the network 5 is indicated as being congested. Then, in order to disable the route assigned #1 in the list of routes, the router 1 indicates the congested state database 210 so that the routing table can be updated as shown in FIG. 15.

It is assumed that data traffic from data terminal equipment connected to the network 1 to the network 7 takes place in the above case. A list of routes from the network 1 to the network 7 in each router is as shown in FIG. 13, in which the network 5 (router 5) does not exist. Hence, the second shortest route that does not pass through the second network 5 and router 5 is selected at each router. Thus, the data traffic from the network 1 to the network 7 is routed to the route 2 without passing through the congested network 5. It is therefore possible to prevent packets from being discarded and ensure excellent communication quality and response.

Figure 16:
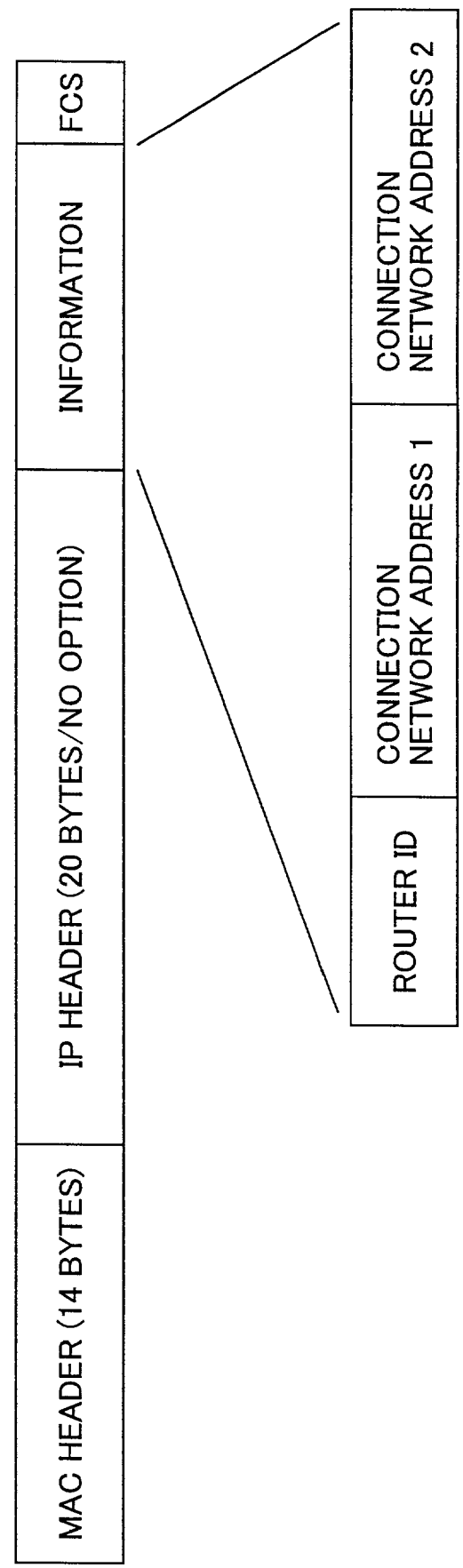
FIG. 16 is a diagram of a topology exchange frame in an RIP operation network.

The network that uses RIP as the routing protocol is of a relatively small scale and may not require congested route avoiding means of the present invention. The RIP differs from the OSPF in that the former does not require each router to own network topology information indicating which router is connected to which network but acknowledges only the address of the next-stage router to which packets should be routed. However, each router will be able to know the topology in such a manner that each router sends the network information indicating which network it is connected to. This will be achieved by, for example, using a packet including information as shown in FIG. 16. The packet shown in FIG. 16 includes the network address to which the router ID which identifies the unique router. The router ID is a unique numeral selected at random.

Each router in the network with the RIP is required to have the topology database shown in FIG. 11 and the congested state database that stores the list of routes shown in FIG. 12. The convention avoiding routing can be realized by updating the routing table on the basis of the above databases and the contents of the congestion information packet.

For example, if all data traffic can be sent along another route, the route which was in the congested state heretofore may not be used at all. Thus, it is necessary to set a condition for selecting a route that avoids the congested route. Alternatively, only traffic that satisfies a particular condition may be sent to another route, so that the network can be utilized efficiently.

The above is achieved by sending the network the congestion information packet shown in FIG. 8 in which a condition for traffic that does not use the congestion avoiding route is included. For example, for traffic in the input queue that is currently in the congested state, the congested state monitor unit collects packets that match a condition by referring to the transmission source and destination addresses of each packet, the protocol ID, the traffic class value and the next header value in the IP header shown in FIGS. 20 and 21 in order to relay packets to the same route. The collected packets are then sent to the congestion information packet creating unit 206, which includes the received packets in the congestion information packets. Each router receives the congestion information packets and sends packets that match the condition to the route in the congested state. The above condition is registered with the list of routes shown in FIG. 13 as an exceptional condition. Further, the routing table 207 is instructed to make a record as indicated by 1402 in FIG. 15. Packets that match the condition are transferred to the ordinary routes.

The following may be defined beforehand. A particular packet is relayed without routing control. For example, a packet from a particular user (that can be identified by the transmission source IP address) or a particular sub-network may be relayed without routing control. Similarly, a packet that meets a specific condition (transmission source IP address, destination IP address, protocol number, port number and interface of router) is relayed.

In the examples shown in FIGS. 2 and 9, if all routes listed along which the target packet should be transported are in the congested state, the packet is relayed to the shortest route because this routing is the most effective way. In this case, the routing table is not rewritten. If the routing table has been rewritten, it is returned to the original state wen all the routes are indicative of congestion.

If all the routes connected to the packet destination are in the congested state, the end systems are preferably notified of the occurrence of congestion as soon as possible. Then, packets are discard in order to remove congestion as soon as possible by reducing the amount of packet transmission by using the congestion control function of TCP provided in the end systems. In the congestion control function, the amount of transmission data is drastically reduced when congestion is detected due to failure of ACK to transmitted data and is gradually increased (slow start algorithm).

The above is performed in the network shown in FIG. 2 as follows. There may be a case where the route including the router 101 and the route including the routers 110 and 111 are in the congested state, when the data sender host 102 starts to send data to the data receiver host 103. In this case, the router 109 discards the packets sent by the data sender host 102 rather than relay in order to avoid continuation of the congested state and cause the data sender host 102 to send a reduced amount of data. This will accelerate relaxation of the congested state in the network and cause the sender host to send wasteful data traffic.

The congestion information may be used to monitor the state of the input queue but the frequency of occurrence of congestion. For example, if congestion occurs a predetermined number of times that is set in the congestion monitor unit within a predetermined time set in a timer 212, the involved interface (route) is acknowledged to have a high possibility of congestion. For example, the number of times congestion occurs is counted within one minute. The average number of times congestion occurs per hour is obtained. Information about the interface at which congestion has occurred more than 10 times per minute is sent, as a frequently congested route, to the adjacent routers or routers located in a given range of the network. For example, if this is the case for the network 5, the topology database is updated as shown in FIG. 12. and correspondingly the router rewrites the routing table in order to perform routing so as to avoid congestion.

When the congestion monitor unit 205 detects restoration from congestion in the input queue 204, the unit 205 sends the congestion information packet containing information about restoration to the adjacent routers or routers located in a given range of the network. In this case, the packet shown in FIG. 8 is used. For example, the packet in which two bits "10" shown in FIG. 8 are set is used.

Each router receives the above packet and updates the congestion information database 210 so that the topology database is returned to the original state and the routing table is rewritten so as to make the previously congested route available.

More particularly, the routing table is returned to the routing table 301 shown in FIG. 4 or the routing table 1401 shown in FIGS. 10 and 15 in which no congestion is defined. Then, packets are routed in accordance with the original contents of the routing table. Simultaneously, the packet discarding process is stopped in which the route that is not the shortest and includes the interface of a router in the congested state.

A description will be given of a second embodiment of the present invention.

Figure 17:
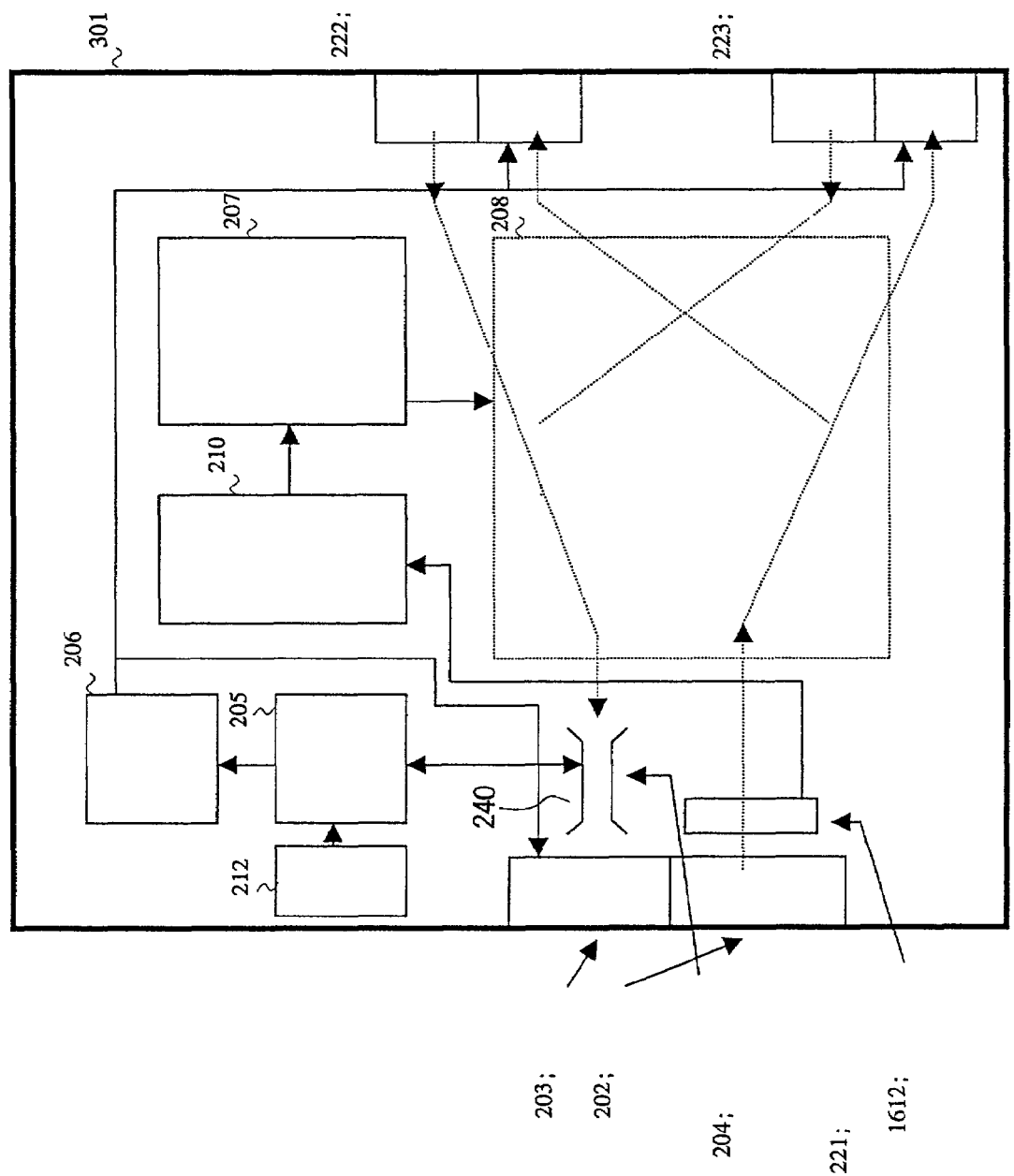
FIG. 17 is a block diagram of a router according to a second embodiment of the present invention.

FIG. 17 is a block diagram of a configuration of a router 301 according to the second embodiment of the present invention. In FIG. 17, parts that are the same as those shown in FIG. 5 are given the same reference numerals. The router 301 is configured so as to monitor an output queue 240 for avoidance of congestion. More particularly, the congestion monitor unit 205 counts the total number of packets that are received via all the input interfaces (connection interfaces) 221, 222 and 223 of the router and are output via a particular outlet (the transmit port 203 of the interface 221 in FIG. 17). In the aforementioned first embodiment of the invention, packets will be discarded if these packets lengthen the queue of the input queue 204 over the threshold level. In contrast, the number of packets in the output queue 240 indicates the total number of packets that is to be sent via the associated output port. Hence, the packet discard ratio can be reduced. There may be a case where traffic is concentrated on a certain single input queue and other input queues are not busy. Such a case will be avoided by monitoring the output queue 240.

The two embodiments of the present invention have been described. The router of the invention is capable of reducing the packet discard ratio and results in improvements in communication quality and response.

Figure 18:
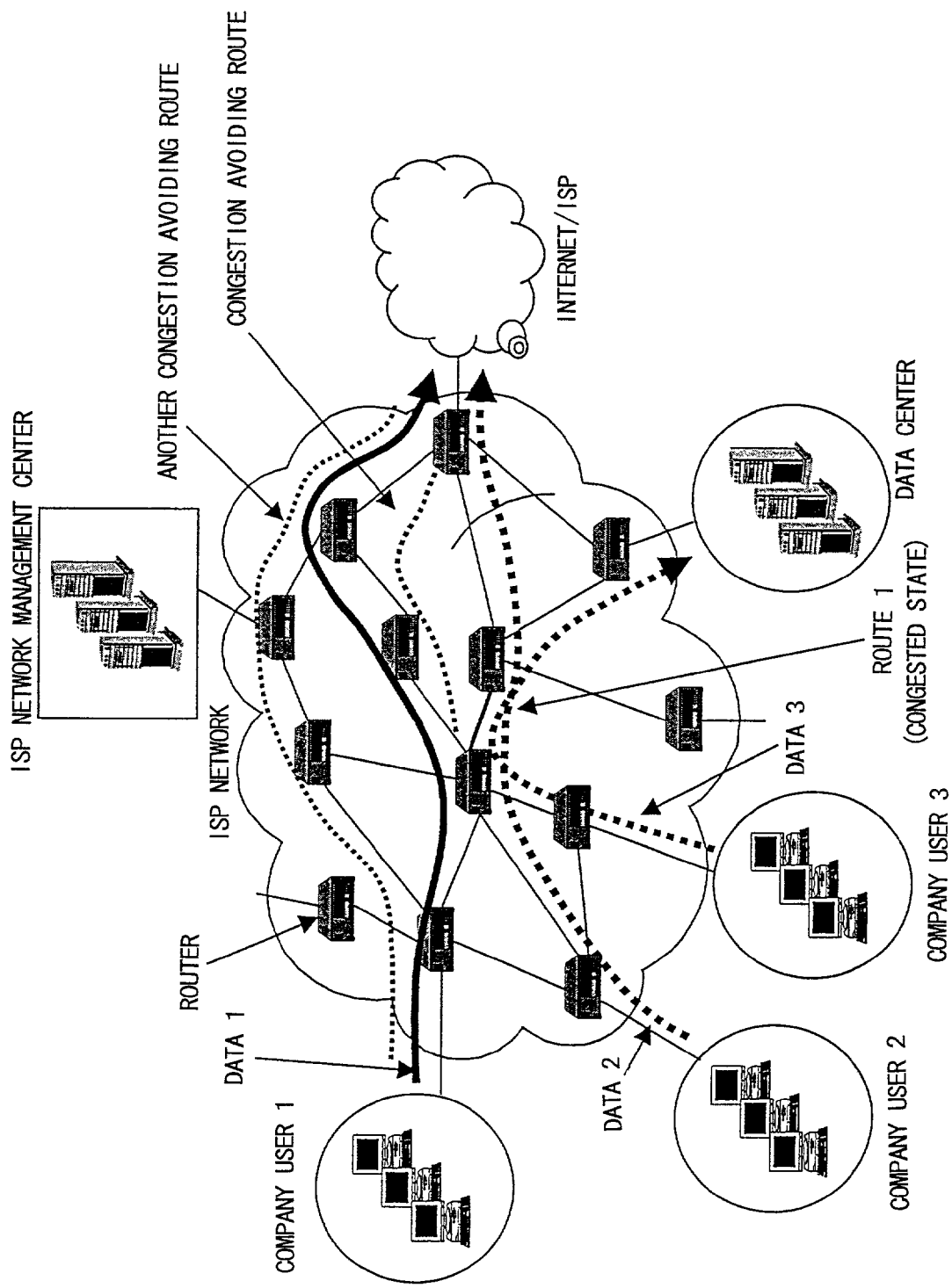
FIG. 18 is a diagram of a business method to which the present invention is applied to an Internet service provider network.

As shown in FIG. 18, routes of the present invention are arranged in a network to which Internet service providers are connected. The use of the routers of the present invention, particularly, the congestion avoiding routing control enables a business model in which good response with a reduced discard ratio because of avoidance of a congested route can be presented to individual users and company users. In such a model, various services can be designed. For example, the users that receive advanced services resulting from the congestion avoiding routing control may be charged with a higher cost.

Referring to FIG. 18, two different company users 1 and 2 are illustrated. The company user 1 contacts the service provider for congestion avoidance service in which a given packet discard ratio, which may, for example, be equal to or less than 5%, is ensured. The company user 2 contacts the service provider for ordinary service. It is now assumed that a large amount of data is transferred between company user 3 and a data center in which a Web server, moving picture delivery service or a file server is installed and that route 1 is congested. Normally, communications between the company users 1 and 2 take place via a route including route 1. In this case, the company user 2 communicates with the company user 1 via the route including the congested route 1 because the company user 2 contracts the provider for the ordinary service (data 2). Hence, packets will be discarded at a high ratio, which results in degradation of communication response. To the contrary to the user 2, the company user 1 contacts the provider for the congestion avoiding service is allowed to use a route in which the congestion is avoided (data 1). Hence, packets will not be discarded at a high ratio, so that good communication response can be realized.

Figure 19:
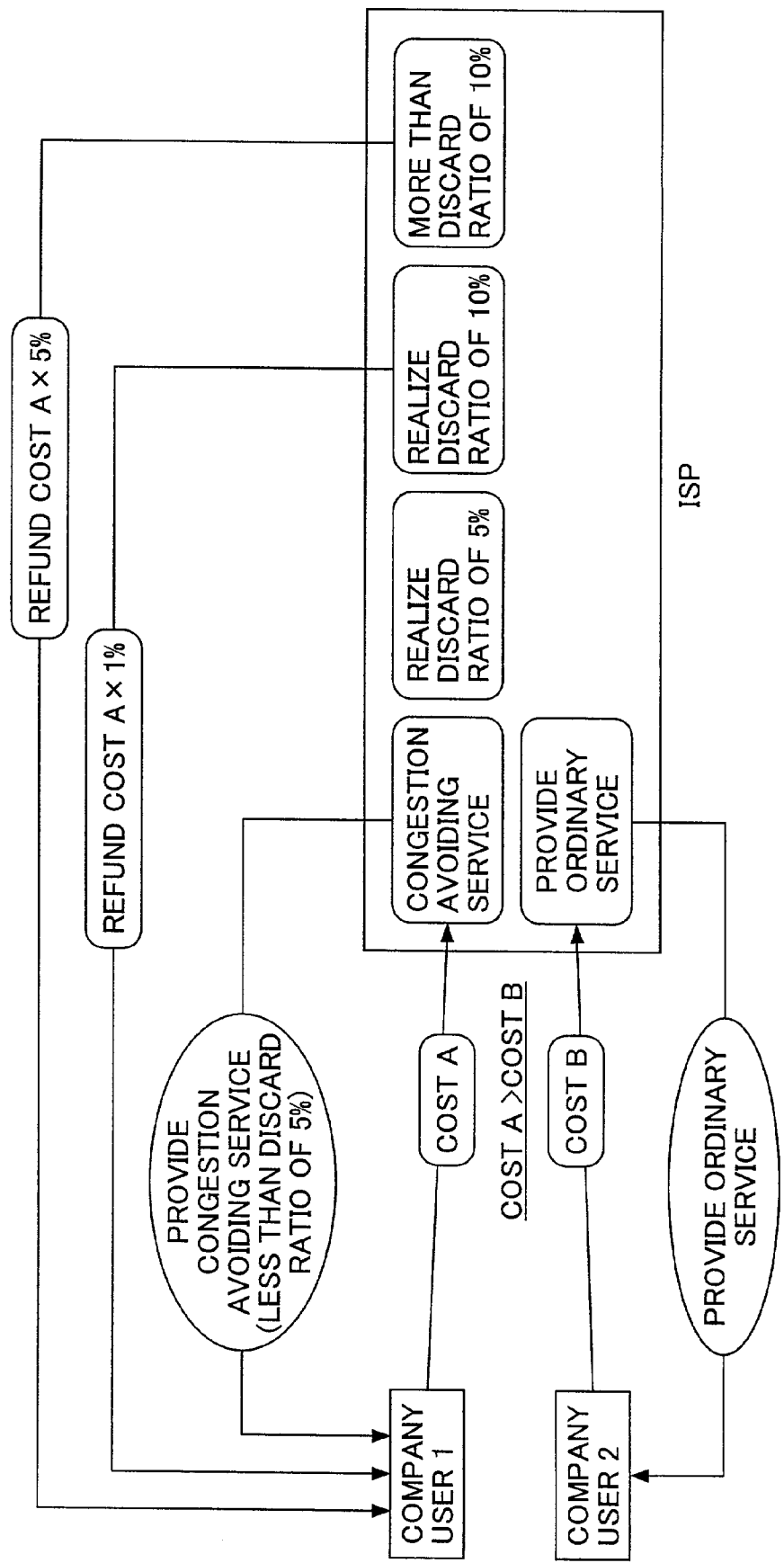
FIG. 19 is a diagram of an accounting method for the business method.

The router of the first stage to which the company user 1 is connected counts the number of packets sent from the user 1 as statistical information. Each edge router (located at the output side of the Internet service provider) counts the number of packets that are output from the service provider as statistical information. The sum of the numbers of packets counted at the respective edge routers indicates the total number of packets that are output from the ISP network. The following equation stands: (packet discarding ratio (%)=1− [(number of output packets)/(number of input packets)]. The ratio thus computed is collected every month at a network management center of the provider, which can manage the customers, accounting, servers and networks. The accounting system can be determined using the collected ratios. If the provider cannot ensure the contracted discard ratio, part of the charge can be refunded to the user on the basis of the difference between the actual ratio and the contracted ratio. For example, the following services may be available:

Low ratio: 5% or less, refund=0,
monthly
collection/settlement
Middle ratio: 10% or less, refund=contacted cost×1%,
monthly
collection/settlement
High ratio: 10% or more, refund=contacted cost×5%,
monthly
collection/settlement FIG. 19 shows a flow of accounting and service between the user and the provider when a contract to receive congestion avoiding service and a given discard ratio ensuring service is made.

The present invention is not limited to the specifically disclosed embodiments, and variations and modifications may be made without departing from the scope of the invention.

What is claimed is:

1. A communication device connectable to an IP network, comprising:
    an input queue holding received packets until the packets are sent for a next process;
    a congestion monitor unit monitoring the input queue and determining whether the communication device is congested;
    a congestion information creating unit creating congestion information concerning a congested state of the communication device, including an exception condition for traffic that does not use a congestion avoiding route when the congestion monitor unit detects the congested state thereof, the congestion information being sent to other devices connected to the IP network; and
    wherein said congestion monitor further monitors a frequency of occurrence of congestion
    a unit for determining a route that avoids congestion for an input packet based on a frequency of occurrence of congestion at a packet destination of the input packet.

2. The communication device as claimed in claim 1, further comprising:
    a routing table storing information used for routing an input packet; and
    an updating unit updating the routing table upon receiving congestion information from another device recording the exception condition for traffic included in the congestion information so that packets matching the condition are transferred to an ordinary route.

3. The communication device as claimed in claim 1, wherein said congestion monitor unit detects a situation in which an input queue of the communication device overflows with packets so that packets are discarded.

4. The communication device as claimed in claim 1, wherein said congestion monitor unit detects a situation in which packets are stored in an input queue of the communication device over a predetermined queue length.

5. The communication device as claimed in claim 1, wherein the congestion information created by said congestion information creating unit is sent to other communication devices adjacent to the communication device.

6. The communication device as claimed in claim 1, wherein the congestion information created by said congestion information creating unit is sent to other communication devices located within a given network range.

7. The communication device as claimed in claim 1, further comprising a unit for relaying congestion information received from another network to a route via which packets can be transported.

8. The communication device as claimed in claim 1, further comprising a unit sending an input packet to an original route if congestion information is received both from another communication device in the original route and from a congested communication device in an alternative route.

9. The communication device as claimed in claim 1, further comprising a unit discarding an input packet if congestion information is received both from another communication device and from a congested communication device in an alternative route.

10. The communication device as claimed in claim 1, further comprising a unit notifying other communication devices of the frequency of occurrence of the congested state monitored by said congestion monitor unit and sending congestion information received from another communication device to a route having a smallest frequency of occurrence of congested state based on the congestion information received.

11. The communication device as claimed in claim 1, further comprising a unit sending information indicative of restoration from the congested state to other communication networks.

12. The communication device as claimed in claim 1, wherein said congestion monitor unit monitors one of an input interface and an output interface of said communication device.

13. A communication control method applied to a device connected to an IP network, comprising the steps of:
   receiving a plurality of packets;
   holding the received packets in an input queue until the packets are sent for a next process;
   monitoring the input queue and determining whether the communication device is congested;
   creating congestion information concerning a congested state of the communication device, including an exception condition for traffic that does not use a congestion avoiding route when the congested state thereof is detected, the congestion information being sent to other devices connected to the IP network;
   defining an accounting system based on a packet discard ratio determined based on a congestion avoiding control; and
   determining a route that avoids congestion for an input packet based on a frequency of occurrence of congestion at a packet destination of the input packet.

14. A communication control method applied to a device connected to an IP network, comprising the steps of:
   receiving a plurality of packets;
   holding the received packets in an input queue until the packets are sent for a next process;
   monitoring the input queue and determining whether the communication device is congested;
   creating congestion information concerning a congested state of the communication device, including an exception condition for traffic that does not use a congestion avoiding route when the congested state thereof is detected, the congestion information being sent to other devices connected to the IP network; and
   determining a route that avoids congestion for an input packet based on a frequency of occurrence of congestion at a packet destination of the input packet.

15. The communication control method as claimed in claim 14, further comprising a step of:
   updating a routing table storing information used for routing an input packet upon receiving congestion information from another device.

16. A system comprising:
   a plurality of communication devices each connected to an IP network,
   each of the plurality of communication devices comprising:
   an input queue holding received packets until the packets are sent for a next process;
   a congestion monitor unit monitoring the input queue and determining whether the communication device is congested;
   a congestion information creating unit creating congestion information concerning a congested state of the communication device, including an exception condition for traffic that does not use a congestion avoiding route when the congestion monitor unit detects the congested state thereof, the congestion information being sent to other devices connected to the IP network; and
   a unit for determining a route that avoids congestion for an input packet based on a frequency of occurrence of congestion at a packet destination of the input packet.

* * * * *